United States Patent [19]

Pease

[11] Patent Number: 5,097,480
[45] Date of Patent: Mar. 17, 1992

[54] ACOUSTIC MODULATION APPARATUS FOR LASER

[75] Inventor: Richard W. Pease, Omaha, Nebr.

[73] Assignee: The MITRE Corporation, Bedford, Mass.

[21] Appl. No.: 469,201

[22] Filed: Jan. 24, 1990

[51] Int. Cl.[5] .......................................... H01S 3/082
[52] U.S. Cl. ..................................... 372/97; 358/302; 358/201; 372/24; 372/107; 359/285
[58] Field of Search ................... 372/24, 97, 98, 26, 372/107; 358/201, 235, 302, 236; 350/358

[56] References Cited

U.S. PATENT DOCUMENTS

| | | | |
|---|---|---|---|
| 3,324,478 | 6/1967 | Jacobs | 350/358 |
| 3,488,437 | 1/1970 | Korpel | 358/201 |
| 3,566,303 | 2/1971 | De Maria | 372/24 |
| 3,590,157 | 6/1971 | Korpel | 358/201 |
| 3,720,784 | 3/1973 | Maydan et al. | 358/302 |
| 3,725,812 | 4/1973 | Scott | 372/97 |
| 3,804,490 | 4/1974 | Montgomery et al. | 372/24 |
| 3,931,592 | 1/1976 | Hughes | 350/358 |
| 4,002,829 | 1/1977 | Hutchison | 358/302 |
| 4,118,675 | 10/1978 | Rahn et al. | 350/358 |

OTHER PUBLICATIONS

Adler, Robert "Interaction between Light and Sound", Zenith Radio Corporation Exhibit 1967, pp. 42–54.
Gorag et al, "A Television Rate Laser Scanner", RCA Review vol. 33 No. 4 (Dec. 1972), pp. 667–673.

*Primary Examiner*—William L. Sikes
*Assistant Examiner*—Susan S. Morse
*Attorney, Agent, or Firm*—Wolf, Greenfield & Sacks

[57] ABSTRACT

The invention comprises a laser light source for a raster laser display. The laser light source comprises a laser cavity, a lasing medium within the cavity, a lasing light source and a series of mirrors within the cavity arranged to reflect the beam of laser light repeatedly through the lasing medium. An acoustic modulator is included having an acoustic medium within the path of the beam within the cavity. Video information on each pixel of the display is converted to an RF signal and fed to a piezoelectric crystal which is coupled to the acoustic medium. The acoustic medium is arranged within the laser cavity with respect to the incident laser beam such that, in response to the acoustic information, the laser beam is either directed towards the screen, or when not needed for the display is directed towards one of the mirrors such that the beam can continue to propagate through the lasing medium.

18 Claims, 4 Drawing Sheets

ACOUSTIC MODULATION APPARATUS FOR LASER

FIELD OF THE INVENTION

The invention relates to acoustic modulators for directing laser light. More particularly, the invention relates to an acoustic modulator embodied within the laser cavity of a laser light source of a raster laser display system for directing the beam or beams towards the screen during the appropriate time periods.

BACKGROUND OF THE INVENTION

In a raster laser display, one or more beams of laser light are scanned across a screen at high speed to create a video display. Typically, a pair of mechanically actuated mirrors sweep the laser beam(s) horizontally across the screen in a series of vertically displaced rows to produce a raster scan similar to a television set. Beams of red, green and blue can be combined on the screen to form a full color display. The various colored beams may be combined at the point where they meet the screen or, alternately, may be combined earlier and transmitted to the screen as a single combined beam.

As the beam(s) are scanned across the screen, video information is fed to a modulator which modulates the laser beams to create the desired display. The modulator receives a stream of video information comprising individual packets of video data, each pocket corresponding to a dot of the display (individual packets hereinafter referred to as pixel data packets). The video display actually comprises thousands of dots (termed pixels hereinafter) arranged in rows and columns. Each pixel is discreetly illuminated by the laser in sequentially time order. The pixels are generated at a very high rate (typically over 1 MHz). The persistence of vision of the observer causes the display to appear illuminated with an entire video image. The scanning of the beam by the mechanically actuated mirrors and the provision of the stream of video data to the modulator are synchronized such that a pixel data packet corresponding to a particular pixel of the display reaches the modulator at a time when the actuated mirrors cause the beam(s) to hit the screen at the corresponding pixel position.

One known method of modulating a laser beam is by use of acousto-optic modulators positioned within the path of the beam(s). In a simple form, an acousto optic modulator directs the beam(s) either towards the screen (actually towards the actuated mirrors which then scan the beam across the screen in a series of subsequent, vertically displaced, horizontal lines) or towards a light absorbing substance. A typical acousto-optic modulator comprises an acousto optic medium positioned within the path of the laser light beam(s). The pixel data packets are converted to an RF acoustic signal by a piezoelectric crystal and introduced from the crystal into the acousto optic medium. In the absence of an acoustic signal propagating through the acousto optic medium, the beam passes through the medium undeflected. However, when sound propagates through the medium, the incident laser beam is deflected at a specified angle dependent upon the wavelength of the sound. In its simplest form, an acousto optic modulator utilizes a single frequency of sound. In the absence of the sound, the incident beam travels straight through the modulator towards a light absorbing substance. However, in the presence of sound, the beam is deflected towards the mechanically actuated mirror system which causes the beam to appear on the screen. The modulator(s) is positioned between the laser light source and the actuated mirror system. One or more of the beams are directed towards the screen by the modulator(s) when the pixel information packet indicates that that pixel of the screen is to be illuminated. Otherwise, the beams are directed towards the light absorbing substance when the pixel information packet indicates that the corresponding pixel position on the screen is to remain dark.

Continuous wave laser light sources suitable in power and wavelength for use in laser projectors tend to be extremely inefficient. Typically, for a continuous wave laser, i.e., a laser with a continuous beam of light, only about 3-10% of the light produced is released. The remaining light stays in the cavity of the light source to continue the light amplification process. The Coupler Transmissance of a laser is the ratio of the amount of light energy which is released from the source to the total amount of light energy produced in the source. Coupler transmission is given as a percentage. The Coupler Transmissance, however, is not necessarily an accurate figure. It is very difficult to actually measure the instantaneous power within a laser cavity since any sampling process in the laser cavity will change the cavity characteristics. Further, it is now believed that the relationship between the Coupler Transmissance and the ratio between internal and external light power may not be linear and that there may be excess optical power in the cavity in comparison to what the Coupler Transmissance would predict.

Beam modulation, whether acousto optic in nature or otherwise, is another cause of wasted light energy. When the modulator directs the beam away from the screen and towards the light absorbing substance, that light energy is not recovered. Typically, in a laser raster display, the display will have a very high proportion of dark content; typically on the order of 80-90%. Thus, in such a display, 80-90% of the light which is released from the laser light source is never used.

Therefore, it is an object of the present invention to provide an acousto-optic modulator in which significantly less light energy is wasted than in the prior art.

It is a further object of the present invention to provide a laser light system for a raster display having increased efficiency.

It is yet another object of the present invention to provide a laser light system for a raster display having an acousto optic modulator which returns the light energy which is not displayed on the screen to the laser light source.

It is yet one more object of the present invention to provide a laser light source having an acousto optic modulator within the laser cavity.

It is a further object of the present invention to provide an improved laser light source.

It is yet another object of the present invention to provide an improved raster laser display system.

It is one more object of the present invention to provide a laser light system for a raster laser display having an acousto-optic modulator which returns the light energy not displayed on the screen to the lasing medium for further amplification.

SUMMARY OF THE INVENTION

The invention comprises a raster laser display system in which an acousto-optic modulator is employed for modulating the laser beam in accordance with the pixel data and is embodied within the laser cavity. The laser cavity includes a lasing medium in which the light energy is created and amplified, and a series of mirrors arranged to reflect the beam repeatedly through the lasing medium. The acousto optic modulator includes an acoustic medium positioned directly within the path of the beam between the mirrors in the laser cavity. A piezoelectric crystal is coupled to propagate sound through the medium. The piezoelectric crystal receives a RF signal containing information as to whether the beam should be deflected towards the screen or not. The acoustic medium is positioned with respect to the beam, and the acoustic information is selected, such that the acoustic information (or absence thereof) which indicates that the beam should not be directed towards the screen causes the beam to travel through the lasing medium towards one of the mirrors and, the acoustic information which indicates that the beam should be directed towards the screen, causes the beam to be deflected to an aperture in the laser cavity. In this invention, therefore, the light which is not directed towards the screen remains in the cavity and is returned to the lasing medium for further amplification. Thus, for any given power consumption rate, the laser light source of the present invention will be brighter than in prior art lasers. Alternately, less power is consumed to produce a display having a particular brightness than in prior art raster laser displays.

DETAILED DESCRIPTION OF A PREFERRED EMBODIMENT

Figure 1:
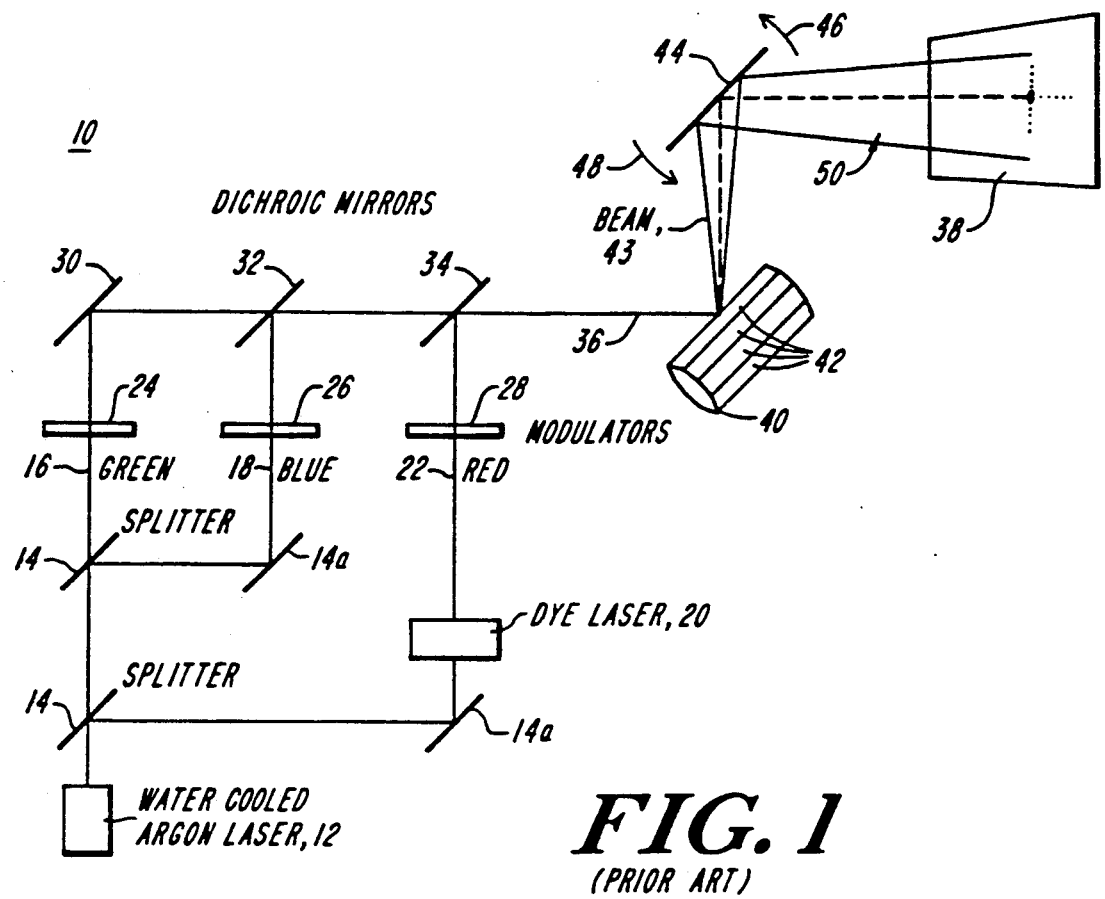
FIG. 1 is a partial block and partial pictorial diagram of a typical raster laser display system of the prior art.

FIG. 1 illustrates a typical prior art laser raster display system 10. FIG. 1 illustrate a full color laser projection system, however, it should be understood that systems having a single color laser are also possible. This system includes a laser light source 12 such as an argon laser. Two dichroic mirrors 14 split the beam into three separate beams of green, blue and red light, respectively. Two reflective mirrors 14a further redirect the light beams. A dichroic mirror is a mirror which allows only light of a c wavelength to pass through and reflects light of all other wavelengths. A dichroic mirror can split the light from an argon laser into green and blue beams 16 and 18, respectively. However, in order to produce the red light beam 22 from an argon laser, an additional die laser 20 is used. Alternately, three separate lasers could be provided to produce the three colors. Modulators 24, 26 and 28 are each positioned in the path of one of the beams 16, 18 and 22, respectively. The modulators are controlled by video signals which cause the modulator to either direct the beam to the mirrors 30, 32 and 34, 32 and 34 of which are dichroic, when the respective color should appear on the screen at a corresponding pixel position or, away from the dichroic mirrors when that color should not appear on the screen. In the full color laser projector shown in FIG. 1, depending on the color desired to be displayed at the particular pixel on the screen, any combination of the three beams 16, 18 and 22 may be directed towards the mirrors 30, 32 and 34, respectively. The mirrors 30, 32 and 34 are positioned to combine the beams 16, 18 and 22 into a single beam as shown at 36. It should be understood, however, that the beams 16, 18 and 22 may be combined at any point subsequent to the modulators 24, 26, and 28. The combined beam 36 is directed towards a set of mechanically actuated mirrors which scan the beam over the screen 38 in a series of subsequent, vertically displaced, horizontal lines. Various configurations of actuated mirrors are known in the prior art. One common actuated mirror configuration is illustrated in FIG. 1. This system comprises at least two mirrors. The first mirror comprises a rotating polygon 40 having a series of reflective surfaces 42. The mirror is an equilateral polygon typically having 24 to 48 mirrored sides or facets. Each facet scans an entire horizontal line of the raster display. Thus, the polygon 40 must rotate at a speed dictated by the number of horizontal lines of the raster display multiplied by the number of frames per second. For instance, if the raster display is to contain 500 horizontal lines and requires 60 frames per second then $500 \times 60$, or 30,000 facets/second must be presented to the incident laser beam. In actuality, however, similarly to a television screen, there is a refresh period between the visible frames which comprise approximately 20% of the time required per frame. Therefore, more practically, the polygon must present $30,000 \times 120\%$, or 36,000 facets/second. If the polygon has 24 facets, then the polygon must rotate at a speed of $(36,000/24) \times 60$ seconds/minute, or, 90,000 revolutions per minute. The polygonal mirror 40 reflects the beam towards a vertical scanning mirror 44. The vertical scanning mirror 44 oscillates in the directions indicated by arrows 46 and 48 in FIG. 1. The beam 50 reflected off of vertical scan mirror 44 is directed towards the screen 38. Thus, the rotating polygonal mirror 40 scans the beam 43 horizontally across the vertical scan mirror 44 while the vertical scan mirror 44 rotates to provide subsequent, vertically displaced lines on the screen 38.

Figure 2:
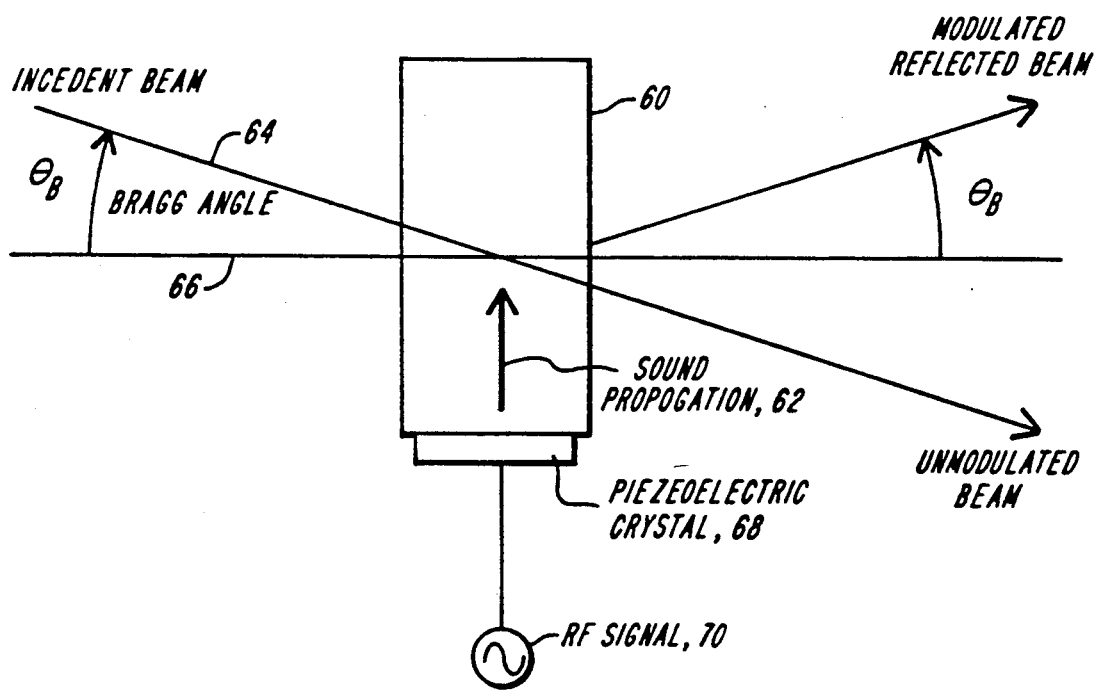
FIG. 2 is a pictorial diagram of an acousto optic modulator of the prior art.

FIG. 2 shows a more detailed pictorial diagram of an acousto optic modulator. An acousto optic modulator operates on certain physical principles governing the interaction of acoustic waves in particular bulk media and light. The medium which the acoustic information propagates through is shown at 60 in FIG. 2. FIG. 2 will be described with respect to a bulk material in which sound waves are caused to travel through the material 60 in a direction indicated by arrow 62. The detailed internal operation of a bulk acoustic material with respect to its effect on light beams passing through it is not fully understood. However, it is known that light passing through a bulk acoustic medium is deflected if acoustic information is passing through the material as if there was a bulk defraction grating in the material. The actual material 60 used in the acousto-optic modulator depends on the required frequency of sound, cost and other factors. For instance, it has been demonstrated that distilled water can transmit sound at frequencies as high as 40 MHz. Other materials such as quartz, $TeO_2$ and $LiNiO_3$ are also available.

The angle at which the incident beam 64 on the medium 60 is deflected is a function of the wavelength of the light in the material and the wavelength of the sound in the material. The following equation defines the angle of the deflection.

$$\sin \theta_B = \frac{\lambda}{2\Lambda}$$

where
$\lambda$ = wavelength of the light
$\Lambda$ = wavelength of the sound, and
$\theta_B$ = Bragg angle.

Defining all angles in relation to the line 66 perpendicular to the direction of sound 62 in the acousto optic medium, a light beam incident the medium at a Bragg angle $\theta_B$ is deflected away from the medium at the same angle $\theta_B$.

The sound is introduced into the medium 60 by a piezoelectric crystal 68. The video information (comprising individual pixel data packets) is converted into an RF electrical signal as shown at 70 and input to the piezoelectric crystal 68. The crystal 68 converts the RF signal into acoustic information.

Figure 3A:
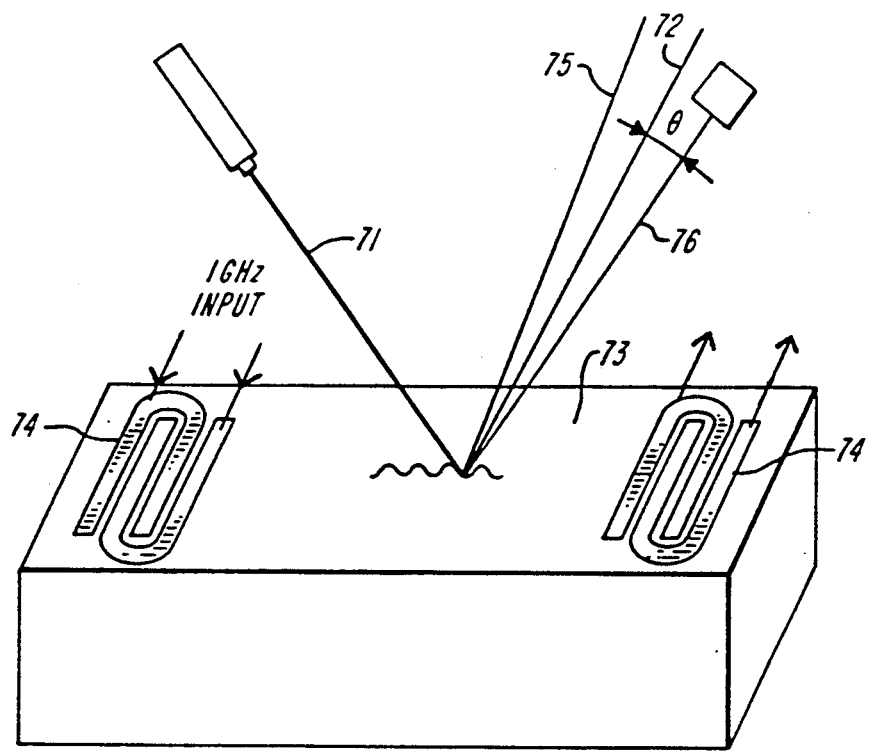
FIGS. 3A and 3B are pictorial diagrams of a surface wave acousto-optic modulator of the prior art.
Figure 3B:
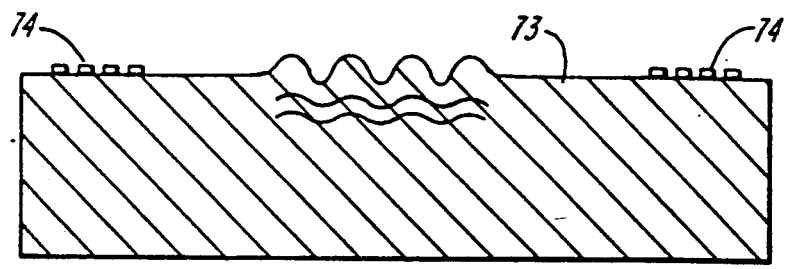

Acousto-optic modulators are also known which use surface wave reflecting materials rather than bulk materials. Such a modulator is illustrated in FIGS. 3A and 3B. In such a modulator, the light beam is reflected off of the surface of the medium rather than internal of the medium. Acoustic oscillations of the desired frequency are introduced on the surface of the medium by ultrasonic vibrators 74. In the absence of modulation, the surface 73 of the medium is flat and the reflected beam 72 leaves the surface 73 at an angle equal and opposite to the incident beam 71. However, in the presence of acoustic modulation, the beam is split in half with half deflected along a path 75 at the positive Bragg angle and the other half deflected along a path 76 at the negative Bragg angle. To present the full intensity of the beams at the screen, the beams must be combined subsequent to the modulator.

In addition to the need to recombine the deflected beams in order to obtain full intensity, a surface wave modulator has an additional drawback. This drawback is the fact that surface wave modulators are not as efficient as bulk modulators by a margin of approximately 10% to 20%. However, there is one significant advantage to surface wave modulators over bulk modulators. In a surface wave modulator, the modulating material need not have any particular optical properties other than surface reflectivity whereas only certain media can be used as bulk modulators.

Figure 4:
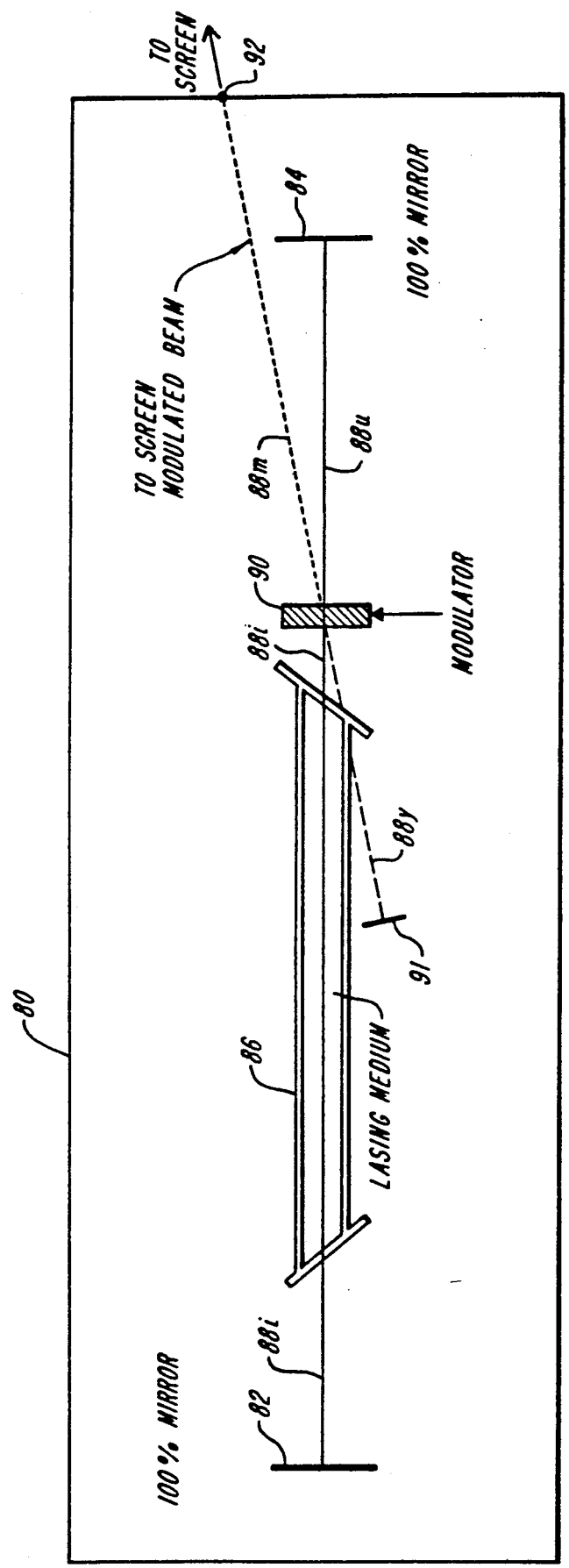
FIG. 4 is a partial block and partial pictorial diagram of the present invention.

FIG. 4 illustrates the apparatus of the present invention. FIG. 4 shows a block diagram of the internal structure of the laser cavity. The laser cavity 80 comprises two mirrors 82 and 84 positioned at opposite ends of the cavity 80. The lasing medium 86 is an electrically excited gas such as argon which produces a beam 88i of coherent, directional light. In the absence of modulation, the beam passes in a straight line between the mirrors 82 and 84 such that the beam is continually passed back and forth through the lasing medium 86. In the present invention, however, a modulator 90 is positioned in the cavity 80 directly within the path of the incident beam 88i. The modulator 90 shown in FIG. 4 is a bulk modulator such as is shown in FIG. 2, however, it should be understood that a surface wave modulator as illustrated in FIGS. 3A and 3B may also be used. FIG. 4 merely illustrates the modulator as block 90, however, it should be understood that the modulator 90 is comprised of the subcomponents illustrated in FIG. 2 i.e., a bulk acoustic medium, a piezoelectric crystal for introducing sound waves into the medium and an RF driver which receives pixel data packets from the accompanying electronics and outputs RF signals to the piezoelectric crystal). In response to acoustic information passing through the modulator 90, the incident beam 88i is deflected at a predefined Bragg angle as illustrated by modulated beam 88m. The cavity 80 is provided with an aperture 92 which allows the modulated beam 88m to pass to the screen. The pixel data packets which are input to the modulator are synchronized with the actuated mirror system to present the pixel data packet corresponding to a pixel position on the screen in synchronization with the actuated mirror system such that the beam will strike the screen at the corresponding pixel position.

When the beam in the laser cavity 80 is not modulated, the beam 88u continues on to mirror 84 and remains within the laser cavity continually passing through the lasing medium 86. When acoustic information is passing through the modulator, the modulator not only deflects beam 88i towards the aperture 92 as shown by beam 88m, but it also deflects the beam 88u reflected from mirror 84 and passing through the modulator 90 in the opposite direction. Thus, whenever acoustic information is passing through modulator 90 such as to deflect the incident ray 88i, return ray 88u is also deflected, at an angle equal and opposite to that of 88m (i.e. 180° from ray 88m). Mirror 91 is positioned to "catch" this ray and return it through the modulator 90. Thus, this light is not lost, but is returned to mirror 84 (note that the speed of the light beam is so fast in relation to the acoustic information passing through the modulator that any deflected light received by mirror 91 is returned to the modulator while the acoustic information is still present, and thus it is deflected back towards mirror 84 rather than traveling straight through towards aperture 92).

In contrast to the prior art, the unmodulated light is not wasted but remains in the cavity and continues to stimulate light amplification. Thus, the present invention avoids large amounts of power loss that is inherent in the prior art designs. Therefore, in the present invention, any given power laser light source produces substantially more usable light energy than in prior art designs.

Further, in the present invention, a much less efficient acousto-optic modulating medium can be used in the modulator than was required in prior art laser light sources. When acoustic information is passed through a modulator so as to deflect the light beam passing therethrough, only a certain percentage of the light is deflected while the remaining light is unaffected. In other words, acousto optic modulators are not 100% efficient. In prior art external modulators, acousto-optic media capable of deflecting 70%-80% of the beam are typically required and are usually quite costly. However, in the present invention, wherein the modulator is located within the cavity, a substantially more powerful beam of light passes through the modulator than in the prior art external modulators. As previously noted, in a continuous beam laser, the power of the beam within the cavity is typically on the order of 10-30 times greater than the power of the emitted beam. Thus, whereas a typical laser light source of the prior art having an external modulator must utilize a modulating medium that is on the order of 70%-80% efficient to produce a display of sufficient brightness, the same power laser using the modulator of the present invention may use an acousto-optic medium having much lower efficiency to produce a beam of the same brightness. Also, as previously noted, the light that is not modulated, either purposely in response to the video information or due to the inefficiency of the modulator, remains in the cavity and can stimulate further amplification thus further increasing the power or the beam in the cavity and reducing efficiency requirements for the modulator. Acousto-optic media having approximately 15%-20% efficiency, such as quartz, are adequate media for the present invention.

In one simple embodiment, the video information is provided as distinct pixel data packets, each packet of which may consist of one of two possible signals. The first signal is generated when the light from the laser source is not to appear on the corresponding pixel position of the screen. This signal is essentially a non-signal in that it does not generate any modulation in the acoustic medium. In response to this signal, the beam 88 will travel undeflected through the modulator and continue to pass between mirrors 82 and 84. The second signal is generated when the beam from the laser is to appear on the screen at the corresponding pixel position. This signal causes the piezoelectric crystal to generate an acoustic signal of a specified non varying frequency for a period of time corresponding to a pixel time period of the system. The required angle of deflection of the beam is dependent on the incident angle of beam 88, the position of aperture 92, the wavelength of the light in beam 88, and the wavelength of the acoustic signal.

In more complex embodiments, various frequencies can be used to deflect the beam toward different destinations. Also, the percentage of light deflected by the modulator (i.e., the efficiency of the modulator) is dependent on the amplitude of the accoustic information. Thus, the invention can be further modified to provide different amplitudes of sounds in order to send different levels of light to the screen.

The angle of deflection is given by the following equation.

$$\sin \theta_B = \frac{\lambda}{2\Lambda}$$

where $\lambda$ = wavelength of the light $\Lambda$ = wavelength of the sound, and $\theta_B$ = Bragg angle.

The above equation defines the deflection of the beam in terms of a Bragg angle, $\theta_B$, as explained previously with respect to FIG. 2.

Figure 5:
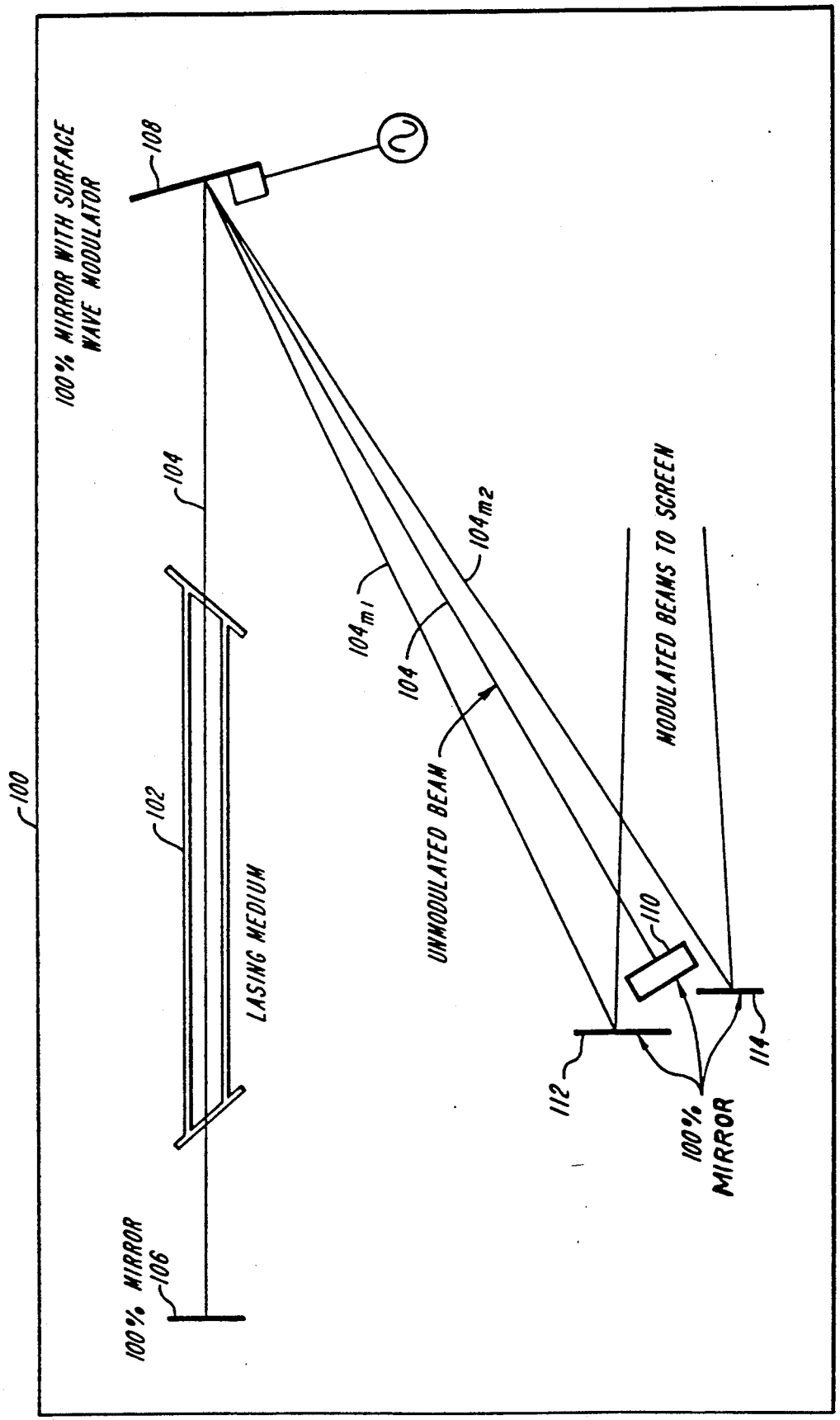
FIG. 5 is a pictorial diagram illustrating an alternate type of acousto optic modulator that can be used in the present invention.

An alternate embodiment of the invention, in which a surface wave modulator is utilized, is shown in FIG. 5. It should be understood that FIG. 5 is merely a pictorial illustration of one possible embodiment of the present invention using a surface wave modulator and that various alternate embodiments will be obvious to those persons skilled in the art. FIG. 5 shows a laser cavity 100 including an excited gas lasing medium 102. The beam 104, when unmodulated, passes through the lasing medium 102 in a path defined by mirrors 106, 108 and 110. Mirror 108 is a surface wave modulator. In response to excitation of surface waves of a specified frequency, the beam 104 is broken into two separate beams $104_{m1}$ and $104_{m2}$. The frequencies of excitation are chosen such that the beams $104_{m1}$ and $104_{m2}$ do not strike mirror 110 but rather strike mirrors 112 and 114 which are positioned to reflect the incident angles $104_{m1}$ and $104_{m2}$, respectively, so that they will eventually strike the screen at the same point. Alternately, only one of mirrors 112 and 114 may be used thus avoiding the need for means to combine the beams at or before reaching the screen. However, if only a single one of the modulated beams is used, the image on the screen will be approximately half than if the two modulated beams are combined.

It should be understood that it is not necessary that the modulated beam be sent to the screen and the unmodulated beam remain in the cavity. Embodiments of the invention are envisioned in which the deflection of the beam in response to acoustic information through the modulating medium directs the beam towards mirrors which continually reflect the beam through the lasing medium and, in the absence of modulation, the beam travels out of an aperture and towards the screen. Such an embodiment provides more light to the screen than in the previously described embodiment in which the modulated signal was sent to the screen. This is because, in the previously described embodiment, only a certain percentage of the incident beam is deflected towards the aperture depending on the efficiency of the modulating medium; while in this embodiment, the full power of the unmodulated beam is sent to the screen. However, in this embodiment, when the beam is modulated away from the screen, some portion of the beam is not deflected due to the same inefficiency of the modulating medium. Therefore, some percentage of the beam always reaches the screen. Thus the contrast between light and dark on the screen remains approximately the same as in the previously described embodiment.

Placing the video display modulator in the laser cavity presents two related problems which must be considered in the design of the light source. Since light is modulated out of the cavity on an irregular basis, controls must be implemented in the light source to prevent too much power from building up within the cavity (and thus burning out the optical components within the cavity) or too much energy from exiting the cavity within too short a period of time so as to deplete the cavity of sufficient light energy to continue the light amplification process and/or to emit the light needed for subsequent pixels. Since the video display applications in which the present invention is likely to be used, such as military command station displays, typically contain a significant amount of dark content in the display, the latter problem is not likely to be significant in most situations. Also, even when the beam is modulated, some of the light energy of the beam (about 10% or more) is not deflected and remains in the cavity. However, in those situations where energy depletion may be a problem, it is possible to provide computer control of the modulation based on the history of the video display by calculating modulation based on a dynamic calculation of how much optical energy remains in the cavity with respect to its recent output history.

With respect to the former concern, there are several options for assuring that too much energy is not built up within the cavity. One option is to partially dump the cavity at regular intervals through an aperture other than the one used for producing the video display. A different acoustic frequency could be passed through the modulator at regular intervals to deflect the beam to this cavity dumping aperture. Alternately, at least one mirror within the cavity can be made to be less than 100% reflective such that a portion of the energy in the cavity constantly escapes. The advantage of this approach is that the design could include means for monitoring the light energy escaping from the cavity in this manner so that the power in the cavity can be constantly monitored. Further means can be provided for partially dumping the cavity if too much power is built up in the cavity.

Having described several possible embodiments of the present invention, it should be obvious to persons skilled in the related arts that various obvious alterations and modifications of the invention are possible. For instance, the laser light source disclosed in this application could be used for photo-resist etching or video disc mastering. Additionally, the raster laser display of the present invention can be used for military or other control room displays, outdoor displays and outdoor advertisements. Such obvious variation and modifications are intended to be included within the scope of the invention which is limited only by the appended claims.

What is claimed is:

1. A real-time raster laser display comprising:
   a laser light source having a cavity having a first light output and defined in part by a pair of mirrors disposed at opposite ends of the cavity along a first optical path, a lasing medium within said cavity, and means for producing a continuous wave beam of laser light,
   a display screen,
   means for generating a video signal that carries a plurality of pixel data packets, each packet comprising video information for a pixel of said display,
   means for raster scanning said beam over said screen to form the display on said screen as a matrix of pixels,
   an acoustic modulator within said cavity responsive to said video signal for directing a portion of said beam along a second path away from said directing means and towards said scanning means, said modulated direction being continuously responsive to said video signal to provide a substantially instantaneous dynamic coupling of said beam portion along said second path to said video signal.

2. A raster laser display as set forth in claim 1 wherein said acoustic modulator comprises;
   an acoustic medium within the path of said beam in said cavity,
   means for converting said pixel data packets into acoustic information,
   piezoelectric crystal means for passing said acoustic information through said acoustic modulating medium,
   said medium, responsive to said acoustic information, altering the path of said laser beam to alternately direct said beam towards said directing means and towards said screen.

3. A raster laser display as set forth in claim 1 wherein said acoustic medium is a bulk acousto optic medium.

4. A raster laser display as set forth in claim 1 wherein said acoustic medium is quartz.

5. A raster laser display as set forth in claim 2 wherein said acoustic medium is a surface wave medium.

6. A raster laser display as set forth in claim 3 wherein said acousto-optic medium is tellurium oxide.

7. A raster laser display as set forth in claim 3 wherein said acousto optic medium is $LiNiO_3$.

8. A raster laser display as set forth in claim 3 wherein said acousto optic medium is water.

9. A raster laser display as set forth in claim 1 further comprising means for dumping the energy of said beam accumulating within said cavity.

10. The raster laser display as set forth in claim 9 wherein said dumping means comprises forming one of said mirrors so that it is less than totally reflective.

11. The raster laser display as set forth in claim 10 wherein said one mirror is about 95% reflective.

12. The raster laser display as set forth in claim 9 wherein said dumping means has a second laser light output and wherein said acoustic modulator directs a portion of said beam along a third optical path away from said directing means toward said second laser light output.

13. The raster laser display according to claim 10 wherein said laser light source is an argon laser.

14. The raster laser display according to claim 9 wherein said dumping means is operated during the flyback of the raster scan.

15. A method for displaying a visual image on a display screen in real time using laser light scanned in a raster across the screen to display a matrix of pixels, comprising
   producing said laser light as a continuous wave in as the lasing medium and a pair of mirrors defining a first optical path through the lasing medium,
   modulating said laser beam within said laser cavity in response to an acoustic signal where the signal at a generally fixed frequency directs a portion of the beam along a second optical path to said display screen,
   said modulating comprising providing an acoustic medium in said first path and applying acoustical energy to said medium at a fixed frequency associated with said second path using a piezoelectric crystal, and
   scanning said second beam at a point external to said cavity in said raster in coordination with said modulation to produce the visual image on said display screen,
   said modulated directing being continuously responsive to said video signal to provide a substantially instantaneous dynamic coupling of said beam portion along said second path to said video signal.

16. The method according to claim 15 wherein said modulating comprises applying a radio frequency to said piezoelectric crystal and wherein said acoustic medium is relatively inefficient, transmitting less than 25% of the optical energy in said cavity along said second path.

17. The method of claim 15 further comprising the step of dumping optical energy from said cavity to prevent an accumulation of energy within said cavity sufficient to terminate said producing of laser light.

18. The method of claim 17 wherein said dumping comprises the step of transmitting a portion of incident light through one of said mirrors.

* * * * *